United States Patent [19]
Hafer

[11] 3,922,053
[45] Nov. 25, 1975

[54] PLUG-IN BUS DUCT

[75] Inventor: Paul M. Hafer, Florence, Ky.

[73] Assignee: Arrow-Hart, Inc., Hartford, Conn.

[22] Filed: Apr. 18, 1972

[21] Appl. No.: 245,118

[52] U.S. Cl............................ 339/22 B; 174/68 B
[51] Int. Cl.²....................................... H01R 13/60
[58] Field of Search ............... 339/22 R, 22 B, 242; 174/68 B, 70 B, 72 B, 88 B, 99 B

[56] References Cited
UNITED STATES PATENTS

| | | | |
|---|---|---|---|
| 3,189,680 | 6/1965 | Stanback | 174/88 |
| 3,462,541 | 8/1969 | Davis et al. | 174/68 B X |
| 3,683,313 | 8/1972 | Weimer et al. | 339/22 B |
| 3,710,302 | 1/1973 | Shannon et al. | 339/22 B |

Primary Examiner—Roy D. Frazier
Assistant Examiner—Robert A. Hafer
Attorney, Agent, or Firm—Wood, Herron & Evans

[57] ABSTRACT

A plug-in bus duct comprised of a group of elongated generally flat busbars positioned in side-by-side relation inside an elongated housing, each busbar extending the length of the housing. Except in the plug-in section, only insulator sheets separate the busbars one from the other, and from the sides of the housing, thereby forming two side wall-insulator sheet-busbar 'sandwich' sections separated by the plug-in section. In the plug-in section, the busbars are laterally spaced or offset one from the other, and from the sides of the housing, thereby providing sufficient space to allow engagement of a plug unit's stabs with the busbars.

8 Claims, 5 Drawing Figures

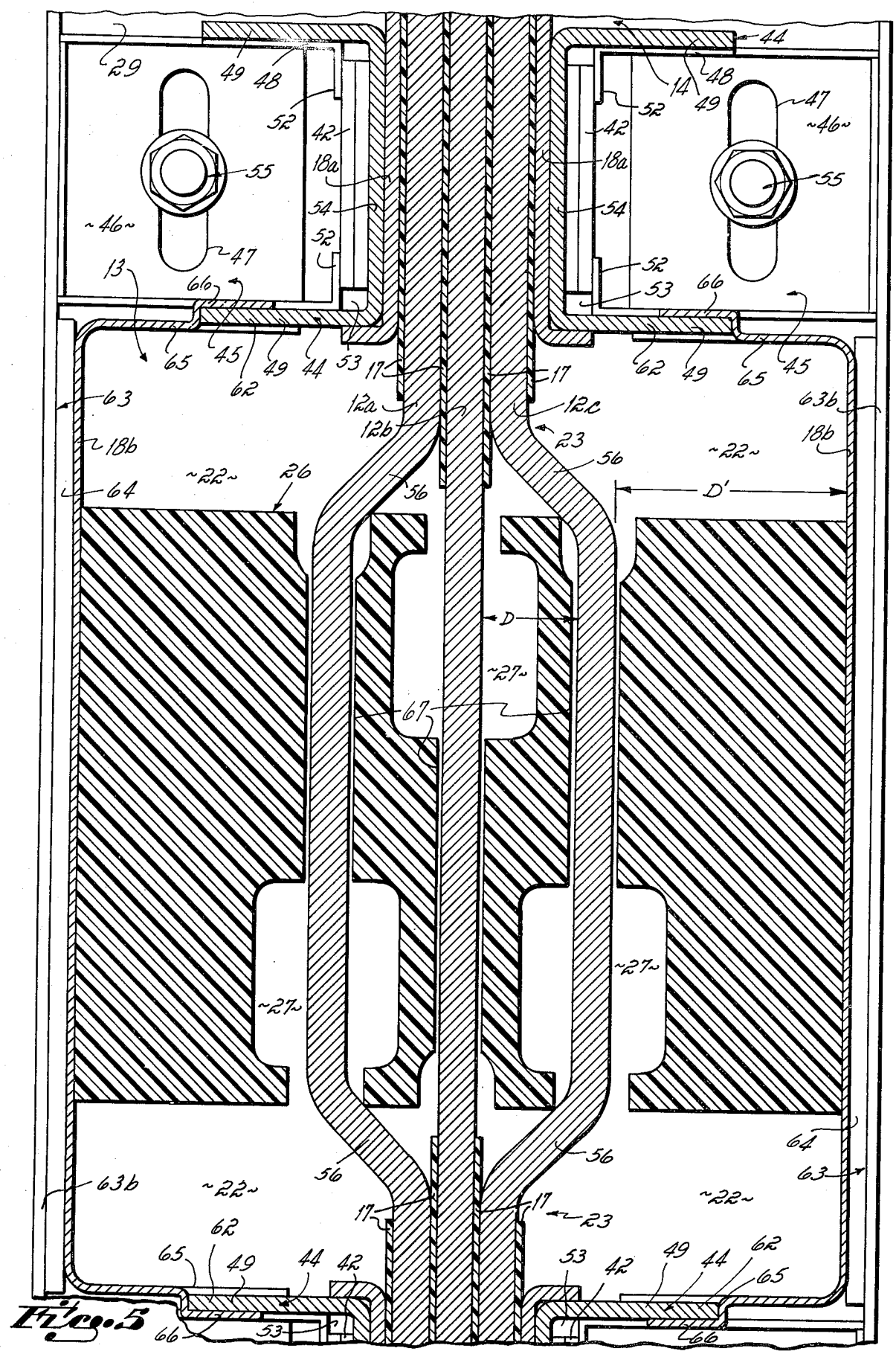

PLUG-IN BUS DUCT

This invention relates to bus ducts and, more particularly, relates to a novel plug-in bus duct.

Electric power distribution systems in industrial and commercial buildings utilize busbars to transfer electric power from a substation or transformer bank to a power consuming area. Such power distribution systems are generally made up of a plurality of bus ducts of variable lengths, the bus ducts being connected or interlocked one to the other in end-to-end relation by a suitable busbar coupler system to provide electrical continuity between the power source and the power consuming area.

A bus duct is comprised of a group of elongated busbars supported in insulated relation relative one to the other within an elongated housing. One type of bus duct structure that has recently been marketed is that type having a plurality of elongated, flat busbars positioned in side-by-side relation within a housing, the housing having a pair of elongated side walls of a height substantially greater than the width of the busbars. The busbars and housing side walls are separated one from the other only by insulation means of the type having a thickness less than the thickness of a single busbar. Bus ducts of this general design have been found particularly desirable for use in relatively low voltage value situations, for example, 600 volts and below, as well as in relatively high amperage value situations, for example, 100 amperes and over. Such a bus duct structure has been found useful because both reactance and impedance are decreased for a given length of bus duct. That is, for a given length of this type bus duct the voltage drop has been found to be less than in a bus duct construction where the busbars may be separated in their side-by-side relation by, for example, air spaces. Further, this type bus duct structure has been found more efficient in dissipating heat created within the busbars when same are loaded with the maximum or approximately maximum amperage capacity. Additionally, the size and weight of a bus duct having this type structure is minimized, thereby making final installation of the duct easier for the contractor.

One bus duct structure of the type described (i.e., of the type where the busbars are separated one from the other and from the sides of the housing only by insulation positioned therebetween, where the insulation is of a lesser thickness than the thickness of the busbars, and where the housing's side walls are substantially greater in height than the width of the busbars) is particularly set forth in U.S. patent application Ser. No. 70,010 (now U.S. Pat. No. 3,636,237), invented by Paul M. Hafer, filed Sept. 8, 1970, and assigned to the assignee of this application. The bus duct structure taught in that application provides a couple of distinct advantages over similar type bus duct structures known to the art. For example, the bus duct structure taught in that application is comprised of simple parts and is easy to assembly during manufacture, thereby providing economical manufacturing costs. Further, the bus duct structure taught in that application does not require insulative wrapping of the busbars, does not require special assembling of the busbars into a preformed assembly, does not require special bonding agents for adhering the housing side walls to the busbar assembly, and does not require welding equipment for achieving the final housing configuration.

In the power consuming area which an electric power distribution system serves, it is oftentimes desirable that a length of bus duct be provided with a special structural configuration, at one or more points along its length, that permits power to be taken off and distributed to machinery or the like in the area served by that bus duct. The specially configured bus duct that permits power to be taken off intermediate its length is generally known as a plug-in bus duct. With all plug-in bus ducts, a plug unit is required to tap power from the bus duct and transfer it into power leads. There are many different types of plug unit structures and, as a matter of fact, generally speaking each manufacturer designs his own plug unit for use with his own plug-in bus duct. Because of this approach to the creation of a power distribution system, the bus duct line marketed by a manufacturer generally includes a plug-in bus duct and a plug unit; such provides a plug-in capability for a bus duct run as installed by the end user, thereby allowing power to be tapped off at a desired point along the run and transferred through power leads to the power consuming area.

But there is one problem that arises in providing a plug-in capability for a bus duct of the type described above, i.e., of the type where the busbars are separated one from the other and from the sides of the housing only by insulation positioned therebetween, where that insulation is of a lesser thickness than the thickness of the busbar, and where the housing's side walls are substantially greater in height than the width of the busbars. This problem is given rise to by the plug unit itself.

It is desirable that the plug unit be structured so that the stabs presented for busbar contact by the plug unit are substantially spaced one from the other in the lateral direction. That is, it is desirable that the plug unit's stabs be laterally spaced one from the other a distance substantially greater than the insulation thickness between busbars. This for the reason that the plug unit's stabs must be insulated one from the other when in an operating or electrical contact relation with the duct's busbars, i.e., when the plug unit is fixed into place on the duct, and such insulation is quite difficult and costly to achieve in the very narrow space provided between the busbars of that type duct to which this invention is directed. Thus, the fact that the plug unit's stabs are laterally spaced a substantial distance one from the other, in combination with the fact that the duct's busbars are spaced from one another only by the thickness of the insulation therebetween, provides a major problem when it is desired to tap power through a plug unit from a bus duct of the type described above.

Therefore, it has been the main objective of this invention to provide a plug-in bus duct that is of the type described above (i.e., of the type where the busbars are separated one from the other and from the sides of the housing only by insulation positioned therebetween, where that insulation is of a lesser thickness than the thickness of the busbars, and where the housing's side walls are substantially greater in height than the width of the busbars) where the busbars are laterally spaced or offset one from the other and from the sides of the housing in the plug-in section of the bus duct, thereby providing sufficient space to allow engagement of the plug unit's stabs with the busbars.

It has been a further objective of this invention to provide a plug-in bus duct of the type set out in the above paragraph that utilizes the structural concepts of that bus duct structure taught in U.S. patent application Ser. No. 70,010 (now U.S. Pat. No. 3,636,237) filed Sept. 8, 1970, invented by Paul M. Hafer, and assigned to the assignee of this application.

In accord with these objectives, this invention contemplates a plug-in bus duct comprised of a group of elongated, generally flat busbars positioned in side-by-side relation inside an elongated housing, each busbar extending the length of the housing except in the plug-in section, and preferably, only insulation separates the busbars one from the other, and from the sides of the housing, thereby forming two side wall-insulator sheet-busbar sandwich sections separated by the plug-in section. In the plug-in section, the busbars are laterally spaced or offset one from the other, and from the sides of the housing, thereby providing sufficient space to allow engagement of a plug unit's stabs with the busbars.

The elongated housing includes a common top wall and a common bottom wall that extend the entire bus duct length. But the side walls are divided into sandwich sections and a plug-in section. All of the side wall sections are of a common height that is substantially greater than the width of the busbars.

The side walls of each sandwich section are preferably maintained in functional assembly with the busbars by (a) at least two clips spanning the side walls at separate positions longitudinally spaced one from the other along the top edges of the side walls, the spanning portion of each of the clips being substantially spaced above the busbar group, and (b) at least two clips spanning the side walls at separate positions longitudinally spaced from one another along the bottom edges of the side walls, the spanning portion of each of the clips being substantially spaced below the busbar group. The clips serve to restrain mechanically the busbar group, insulator sheets, and sandwich sections' side walls in compact, assembled, side-by-side relation; this, in turn, fixes those components in bus duct configuration since each busbar extends from one end of the duct to the other. The top and bottom walls are fixed in place, e.g., by bolts, to the sandwich sections.

The side walls of the plug-in section are configured to cooperate with locating ribs fixed to the sandwich sections' side walls, and to the top and bottom walls. When the top and bottom walls are fixed to the assembled sandwich sections, this structure allows the plug-in sections' side walls to be simply captured within a pocket defined by those locating ribs and the top and bottom walls, thereby cooperating with the sandwich sections' side walls to provide side walls that extend the entire bus duct length.

Other objectives and advantages of this invention will be more apparent from the following detailed description taken in conjunction with the drawings in which:

FIG. 5 is a top cross-sectional view of the plug-in section and is taken along line 5—5 of FIG. 4.

GENERAL

Figure 1:
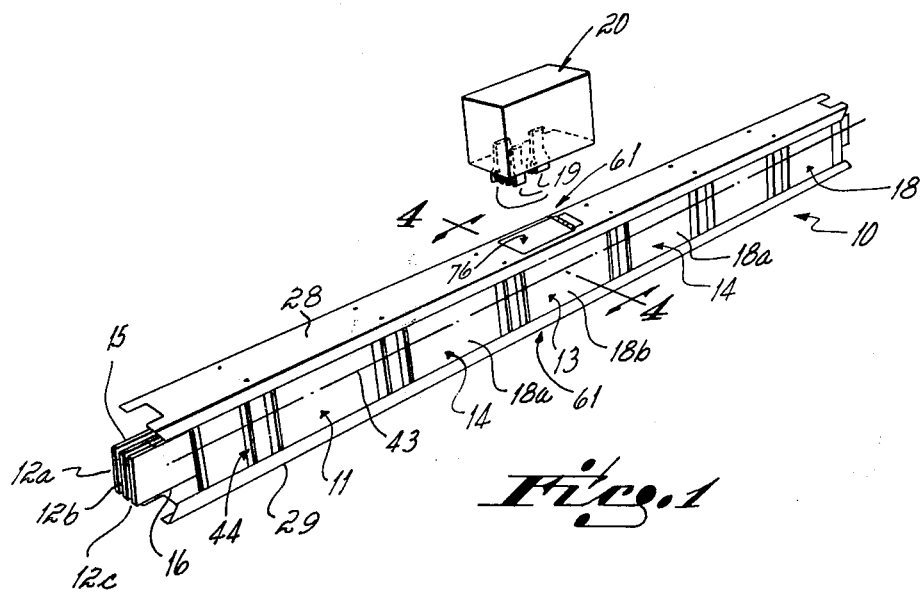
FIG. 1 is a perspective view of the plug-in bus duct of this invention and a plug unit adapted for use therewith.
Figure 2:
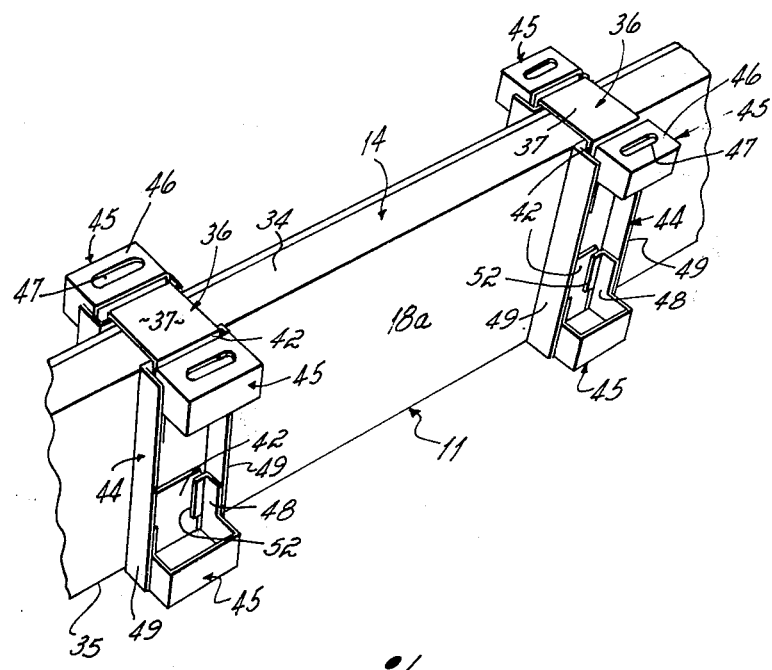
FIG. 2 is a partially broken away perspective view of one sandwich section with the top and bottom walls removed.
Figure 3:
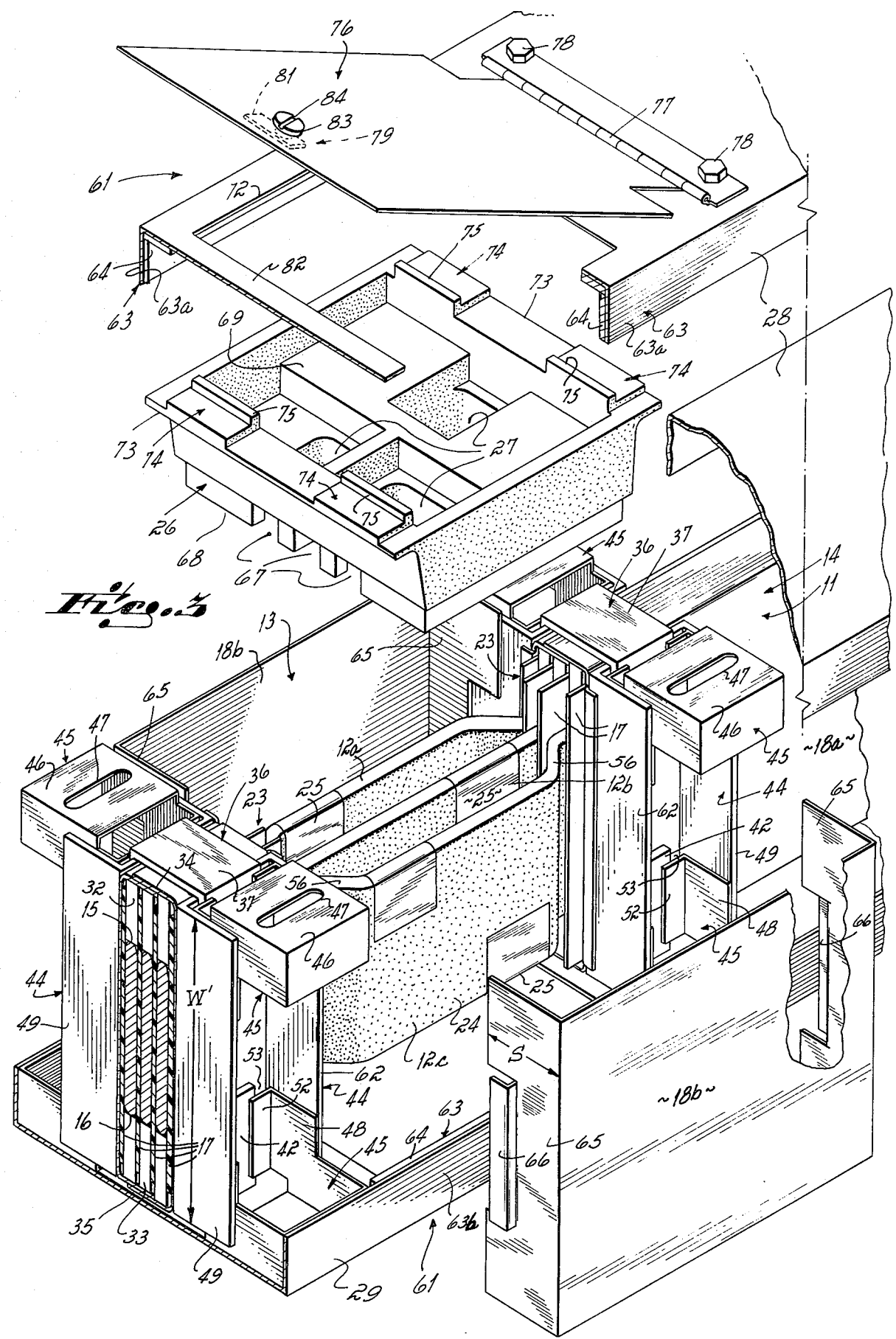
FIG. 3 is a partially exploded, partially broken away perspective view of the plug-in section.

As illustrated in FIGS. 1, 2, and 3, the plug-in bus duct 10 of this invention includes a housing 11 and a group of separate, elongated, generally flat busbars 12a, 12b, 12c, positioned in side-by-side relation within the housing. The housing 11 and busbars 12 are made up of a plug-in section 13 that is interposed between two sandwich sections 14, the plug-in section providing the plug-in capability that permits power take off intermediate the ends of the duct by means of a plug unit 20. The busbars 12 are of substantially the same external dimensions, and are positioned in a group having opposite edges 15, 16 in a substantially common plane to form a generally rectangular cross section when viewed from the end thereof; each of the busbars extends the full length of the housing 11 from one end to the other.

Except in the plug-in section 13, only insulation separates the busbars 12 one from the other, and from the sides 18 of the housing 11, thereby forming the two side wall-insulator sheet-busbar sandwich sections 14 that are separated by the plug-in section 13, see FIGS. 3 and 5. This insulation may be in the form of insulation sheets 17 only, or the busbars 12 may be wrapped in insulation tape (not shown) throughout the lenth of each in combination with the sheets 17, in all sections of the duct except the plug-in section. In the plug-in section 13, the busbars 12 are laterally spaced a distance D one from the other and a distance D' from the sides 18 of the housing, thereby providing sufficient space in the form of air gaps 22 to allow engagement of the plug unit's stabs 19 with the busbars. The bars 12 are wrapped with insulation tape 24 only within the plug-in section 13, i.e., no insulation sheets are provided in the plug-in section.

In each sandwich section 14 a series of the separate, flat, elongated insulator sheets 17 are positioned between adjacent busbars 12, and between each of the sandwich sections' side walls 18a and the outer most busbars 12a, 12c, of the group, to insulate the busbars one from the other and from the sandwich sections' side walls, see FIG. 5. Note that, in this sandwich relationship of the busbars 12a–12c and insulator sheets 17, the busbars are each of a planar configuration from one end of the sandwich section 14 to the other. Thus, the insulator sheets 17 and the busbars 12 are arranged flatwise in side-by-side relation and lie parallel with the sandwich sections' side walls 18a.

Figure 4:
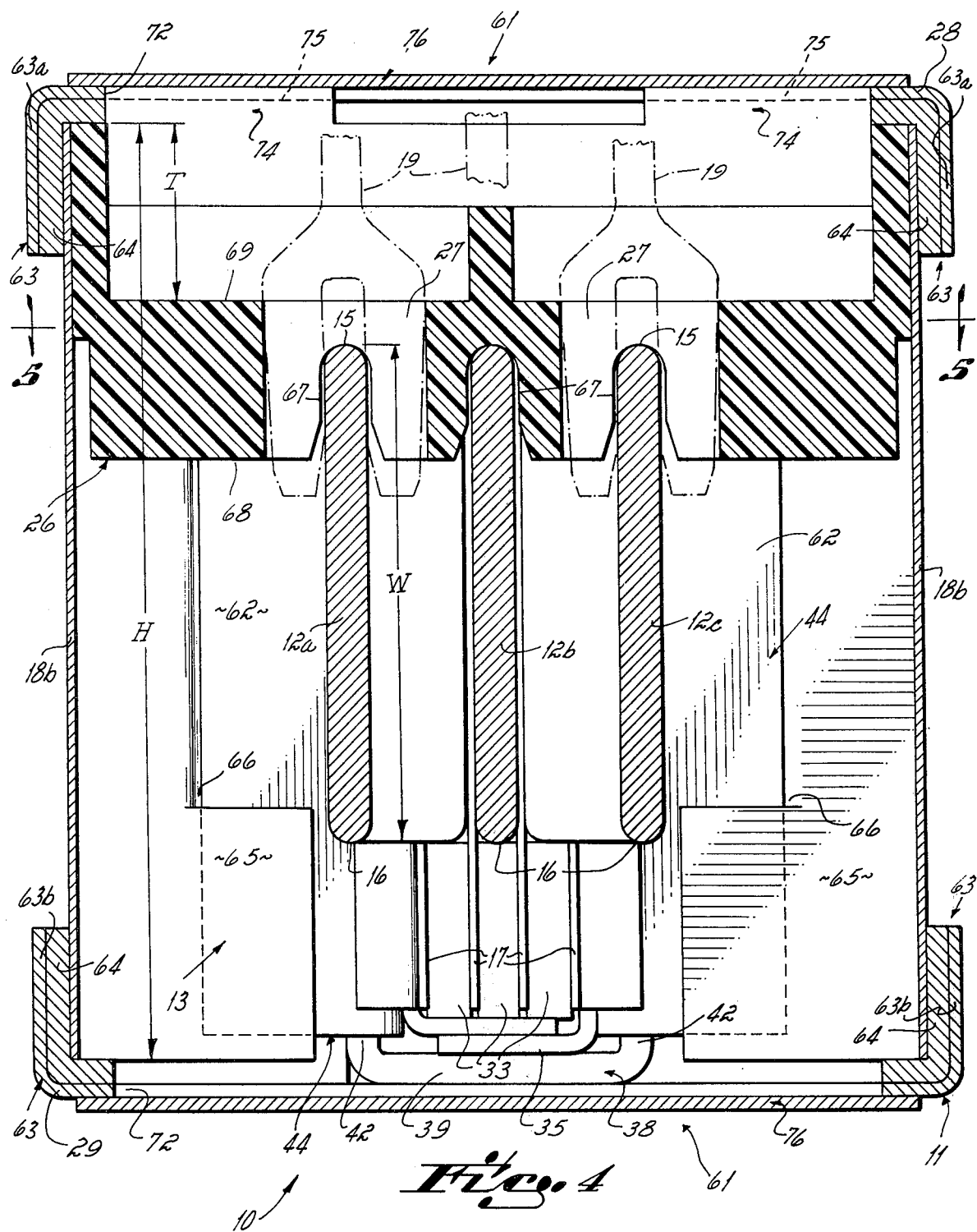
FIG. 4 is an end cross-sectional view of the plug-in section and is taken along line 4—4 of FIG. 1.

On the other hand, in the plug-in section 13 the busbars 12 are laterally spaced or offset from one another, and from the plug-in section's side walls 18b, a substantial distance as indicated by air gaps 22, see FIGS. 4 and 5. There are no insulator sheets separating the busbars 12 within the plug-in section 13, the busbars being separated one from the other and from the side walls 18b by the air gaps as the insulator sheets terminate at the point 23 where the busbars flare away from one another in the plug-in section. The busbars 12 are, however, wrapped with electrical insulation tape 24 within the plug-in section except in certain areas 25 adapted to be engaged by the stabs 19 of the plug unit 20. Further, each plug-in section 13 seats an insulator template 26 on the top edges 15, and on the bottom edges 16, of the laterally spaced busbars to cooperate with the plug unit 20; the lower template is not shown in the drawings but it should be understood that same seats on the busbars' bottom edges in a manner identical with that of the top template on the busbars' top edges. The templates 26 each define a series of pockets 27 equal in number to the number of busbars 12 in the duct 10, the pockets serving to insulate the plug unit's stabs 19 from one another when the plug unit 20 is fixed onto the bus duct.

The elongated housing 11 includes a common top wall 28 and a common bottom wall 29 that extend the entire bus duct 10 length, see FIGS. 1–3 and 4. But the side walls 18 are divided into sandwich sections 18*a* and plug-in sections 18*b*. Referring to FIGS. 3–4, note that the height H of the housing's side walls 18 is substantially greater than the width W of the busbars 12, the width of each busbar being equal to the width of all other busbars.

THE SANDWICH SECTIONS

The side walls 18*a* of each of the bus duct's sandwich sections 14 are comprised of channels which face toward one another and are telescoped into one another when finally assembled, see FIGS. 2 and 3. The housing's top 28 and bottom 29 walls are also channel sections, and these sections also face toward one another but are sufficiently spaced away one from the other so that they do not in any sense telescope one within the other when finally assembled, see FIGS. 1 and 4. The busbars 12 are centered relative to the side walls 18*a*, that is, the busbars are spaced equally from the housing's top 28 and bottom 29 walls, so that an air gap 32 is provided above the top edge 15 of the busbars and an air gap 33 is provided below the bottom edge 16 of the busbars, see FIGS. 3–4.

As shown in FIG. 3, the insulator sheets 17 extend a substantial distance into the air gaps 32, 33 and extend up adjacent to the top edges 34 of the side walls and adjacent the bottom edges 35 of the side walls. That is, note that each of the insulator sheets is of a width W' substantially greater than the width W of the busbars 12, and that each insulator sheet's width dimension W' is preferably on the order of the height of the housing's sides 18. Such a width dimension W' of the insulator sheets 17 acts to prevent electrical creepage between adjacent busbars 12 and between the outermost busbars and the housing's side walls 18*a*. Also note that the thickness of the insulator sheets 17 is substantially less than the thickness of the busbars 12.

In each of the sandwich sections 14, at least two U-shaped clips 36 are positioned to span the side walls 18*a* at separate positions longitudinally spaced from one another along the top edges of the side walls, the spanning portion 37 of each of the clips being substantially spaced above the top edge 15 of the busbars 12 and in substantially the same plane as the housing's top wall 28, see FIGS. 2–3. Likewise, at least two U-shaped clips 38 are positioned to span the side walls 18*a* at separate positions longitudinally spaced from one another along the bottom edges of the side walls, the spanning portion 39 of each of these clips being substantially spaced below bottom edge 16 of the busbars 12 and in substantially the same plane as the housing's bottom wall 29. The clips 36, 38 are provided to restrain mechanically the busbar 12 group, the insulator sheets 17 and the side walls 18*a* in compact, assembled side-by-side relation. That is, clips 36, 38 hold the busbar 12, insulator sheets 17, and side walls 18*a* in functional assembly by squeezing the side walls 18*a* toward one another, thereby acting to maintain the busbar 12-insulator sheet 17-side wall 18*a* combination or sandwich in the desired spatial and operational configuration.

When in locking or clamping position after assembly of the bus duct 10, the legs 42 of each clip 36, 38 are positioned on the outside of the side walls 18*a* and the clips' spanning portions 37, 39 span the side walls 18*a*. The clips 36, 38 are preferably positioned in pairs longitudinally along the bus duct 10, each pair comprising a top clip and a bottom clip and each pair being disposed in a plane substantially transverse to the axis 43 of the bus duct, see FIGS. 2–5.

Each of the sandwich sections 14 is additionally provided with a plurality of reinforcement members 44 in the form of heavy-duty channels, the heavy-duty channels being positioned against each of the side walls 18*a*, see FIGS. 1–5. Each reinforcement member 44 forms a part of a complete force frame surrounding the busbars 12 insulator sheets 17 and side walls 18*a*, the force frames for holding the busbars and insulator sheets in assembled sandwich relation thus including clips 36, 38, side walls 18*a* and reinforcement members 44 (i.e., the heavy-duty channels). Each of the heavy-duty channels 44 is positioned substantially transverse to the axis 43 of the bus duct against the housing's side walls 18*a*, and a heavy-duty channel is positioned to cooperate with each pair of the U-shaped clips 36, 38 on each side of the bus duct's housing 11. The width of the spanning portion 37, 39 of each U-shaped clip 36, 38 is sufficient to permit the legs to embrace the two heavy-duty channels 44 positioned on opposite sides of the housing against the housing's side walls 18*a*, as well as the group of busbars 12, insulator sheets 17 and the side walls 18*a*.

A bracket 45 is welded to the upper end and to the lower end of each heavy-duty channel 44, see FIGS. 2–5. Each bracket 45 includes a base portion 46 having an elongated slot 47 therein; the base is integral with leg portions 48 that are welded to the inside of flanges 49 of the reinforcement member 44. Each leg 48 of the bracket 45 had a guide strip 52 formed thereon. The guide strips 52 are thus fixed to the heavy-duty channel 44 since the bracket 45 is welded thereto. The guide strips 52 of each bracket 45 are positioned such that a gap 53 is provided between the guide strips and the base 54 of the heavy-duty channel after welding the two parts together. The legs 42 of the U-shaped clip 36 or 38 are received in the gap or slot 53 so defined when the U-shaped clip is assembled with the busbar 12-insulator sheet 17-side wall 18*a* sandwich. This structure prevents the legs 42 of the clips 36 or 38 from flaring outwardly in times of high short circuit stress and serves to reinforce the bus duct 10 assembly.

The elongated slot 47 in each bracket 45 is positioned to receive bolts 55 which pass through suitable holes (not shown) in the top wall 28 and bottom wall 29 of the housing 11, the top wall and bottom wall of the housing thereby being bolted to the brackets 45. Thus, the top wall 28 and bottom wall 29 are indirectly fixed to the side walls 18*a* through brackets 45 that are mounted (for example, welded) to heavy-duty channels or rigid support members 44. This, of course, means that the top wall 28 and bottom wall 29 re fixed to the duct's sandwich sections 14.

It is because the busbars 12 are each of one-piece configuration (even though the outer busbars 12*a*, 12*c* may be stepped as at 56 intermediate their ends) that the bus duct 10 is formed into an integral unit by assembling the busbars 12 with the sandwich sections' side walls 18*a* by means of clips 36, 38. That is, it is the assembly of the sandwich sections' side walls 18*a* with the busbars 12 by clips 36, 38 that provides a preassembled unit onto which the top 28 and bottom 29 walls are fixed, and which defines structure that permits mounting of the plug-in sections' side walls 18b as described below.

THE PLUG-IN SECTION

Each length of the plug-in bus duct 10 of this invention has at least one take off point 61 located in either the top or bottom of the duct. Preferably, however, the plug-in section 13 will be made up of a pair of take off points 61, access to one being provided in the top wall 28 of the duct and access to the other one being provided in the bottom wall 29 of the duct. With such a structure the installer of the plug-in bus duct 10 need not worry as to which is the top and which is the bottom of the duct; i.e., this structure allows freedom in installation of the bus duct without worry as to which of the top 28 and bottom 29 walls is most conveniently faced for future installations of a plug unit 20 when same proves desirable. Further, more than one plug-in section 13 and, hence, more than one pair of take off points 61 may be provided in each length of plug-in bus duct 10, the number of pairs provided being dependent on the end use of the bus duct and the number of power take off points required in the power consuming area. The portion of plug-in bus duct 10 illustrated in FIG. 1 includes a single plug-in section with one pair of take-off points 61, there being a take off point in the housing's top wall 28 and a take off point in the housing's bottom wall 29.

The plug-in section 13, as noted, is located between two successive sandwich sections 14. The top wall 28 and bottom wall 29 extend the entire bus duct 10 length, but the side walls 18 for the separate sections are separate from one another, i.e., the plug-in sections' side walls 18b are not common or of one piece with the sandwich sections' side walls 18a. However, all side wall sections 18a, 18b cooperate together, as explained in detail immediately below, to enclose the busbars 12 from the side from one end of the bus duct to the other.

Basically, the side walls 18b of the plug-in section 13 are configured to cooperate with locating ribs 62 fixed to the sandwich sections' side walls 18a that are adjacent to the plug-in section 13, and to that portion of the top 28 and bottom walls 29 adjacent to the plug-in section. Also, the side walls 18b of the plug-in section 13 are configured to cooperate with locating flanges 63 provided by the top 28 and bottom 29 walls. When the top 28 and bottom 29 walls are fixed by bolts 55 to the adjacent assembled sandwich sections 18a, this structure allows the plug-in sections' side walls 18b to be simply captured within a pocket defined by those locating ribs 62, 63 and the top 28 and bottom 29 walls, thereby cooperating with the sandwich sections' side walls 18a to provide side walls 18 that extend the entire bus duct 10 length.

More particularly, the plug-in section 13 is located between successive pairs of vertical reinforcing members 44. It is the vertical fins 49 of the vertical reinforcing members 44 that provide the locating ribs 62 which are fixed to the sandwich sections' side walls 18a on each side of the bus duct. Further, it is the downwardly depending and upwardly extending flanges 63a, 63b of the top and bottom walls, respectively, that provide the locating ribs 63 which are fixed to the top and bottom walls. Shims 64 seated in the corners of the top 28 and bottom 29 walls, see FIGS. 3–5, insure proper definition of the pocket adapted to receive the plug-in section's side walls 18b when the top and bottom walls are assembled with the sandwich sections 14, and also serve to reinforce the top and bottom walls in that area around access holes 72 in those walls. The shims 64 are welded to the walls 28, 29 and run between successive reinforcing channels 44 axially spaced at opposite ends of the plug-in section on each side of the plug-in section.

The plug-in section's side walls 18b are of a height equal to the height of the sandwich sections' side walls 18a, and are channel shaped in configuration. The depth S of the side walls' flanges 65 is sufficient to provide adequate clearance with the laterally spaced busbars 12 in the plug-in section 13 when the side walls 18b are in final assembly, see FIGS. 4 and 5. Further, the side walls' flanges 65 are structured to define fingers 66. These fingers 66 are adapted to fit over or seat upon the locating ribs 62 fixed to the sandwich sections' side walls 18a, thereby positively locating the plug-in section's side walls 18b in a direction transverse to the bus duct's axis 43 so that those side walls will be located in the pocket when the top 28 and bottom 29 walls are bolted to the sandwich section's side walls. Thus, the plug-in section's side walls 18b protect the busbars 12 from the environment in which it is placed, but they do not aid in holding the duct 10 in functional assembly as do the sandwich sections' side walls 18a.

Also the plug-in section 13, a template 26 is interposed between the top edges 15 of the laterally spaced busbars 12 and the top wall 28, and a template (not shown) is interposed between the bottom edges 16 of the laterally spaced busbars and the bottom wall 29, see FIGS. 3–5. The templates 26 are formed of an insulating material, and each is provided with a number of grooves 67 in its bottom face 68 equal to the number of busbars 12. The grooves 67 are of a width substantially equal to the thickness of the busbars 12, and the grooves are of a depth sufficient to embrace the busbars to a limited extent when the template 26 is seated thereon as illustrated in FIG. 4. The template 26 is also provided with a series of holes 27 therethrough from the top face 69 to the bottom face 68, the holes being equal in number to the number of busbars 12 carried by the housing 11. The holes 27 are not located in alignment transverse to the bus duct's axis 43 so that not more than every other hole is located in the same transverse plane relative to the duct's axis. This provides added rigidity to the templates 26 from a mechanical strength standpoint.

The insulative template 26 is received within an opening 72 in, e.g., the top wall 28 of housing 11, the template's groove 67 cooperating with the busbars 12 to center holes 27 over the top edges 15 of busbars, thereby seating the template on the busbars. The template 26 has sides of a thickness T sufficient to extend up into contact with the shims 64 fixed to the underside of the top wall 28, thereby positively locating the template within the air gap 12. The plug unit's stabs 19 are received vertically from outside the housing 11 to make electric contact with the busbars through the holes 27, see FIG. 4.

The template is provided with a lip 73 extending from the forward and trailing ends thereof, see FIG. 3. Flanged pads 74 are provided on the top of these lips 73. The geometry of these flanges pads 74 is such that their flanges 75 protrude through the opening 72 to preclude axial movement of the template 26. The template 26 is totally supported by the busbars 12 cooperating with the grooves 67 on the bottom face 68 thereof, although it may be supported, if desired, by extending the lips 73 so that they will overlap the edges of the flanges 65 of the housing side walls 18b. Further, the template because of the opening 72, flange 75 configuration is located axially of the duct 10 within the plug-in section 13 by this structure to insure that the template's holes 27 are aligned with the bare or uninsulated areas 25 of the busbars 12 on assembly.

To assembly the top template 26 with the bus duct's housing 11 same is simply slipped into place over the busbars 12. The template 26 is held within the housing 11, once the top wall 28 of the housing is bolted in place to brackets 45, by virtue of the rectangular hole 72 in the housing's top wall 28 being of smaller dimensions than the rectangular periphery of the template. This housing top 28-template 26 geometry provides a rectangular frame, so to speak, in the housing's top wall that overlies the lips 73 and other peripheral portions of the template to restrain same in its operating environment, see FIGS. 3 and 4. It will be particularly noted that this allows a very simple method of assembly requiring no special tools or skill on the part of the assembler.

Each opening 72 in the housing's top 28 and bottom 29 walls is provided with a door 76 that is pivotable between a closed position where access to the stab holes 27 defined by the template 26 is sealed from the environment of the bus duct 10, and an open position at which the stab holes are exposed to receive a plug unit's stabs 19. The door 76 is in the form of a flat sheet metal piece, and is provided with external dimensions and a configuration that insure closure of the opening 72 in the top or bottom wall. The door 76 is pivotally mounted to the housing's top by a hinge 77, the hinge plate being fixed to the top wall by bolts 78.

A latch 79 maintains the door 76 in the closed attitude. The latch 79 is comprised of a thumb 81 on the door's underside that is adapted to rotate under lip 82 defined by the top 28 or bottom 29 wall. The thumb 81 is fixed to bolt head 83 that extends through the door 76, slot 84 on the bolt head allowing the thumb to be rotated between a latching position under the lip (not shown) and an unlatching position under the door (shown in FIG. 3) simply through use of a screwdriver.

As noted previously, the plug-in bus duct of this invention makes use of the novel structural concepts taught in U.S. patent application Ser. No. 70,010 (now U.S. Pat. No. 3,636,237), filed Sept. 8, 1970, invented by Paul M. Hafer and assigned to the assignee of this application. Basically, the plug-in bus duct of this invention makes use of the bus duct structure taught in U.S. patent application Ser. No. 70,010 (now U.S. Pat. No. 3,636,237), but includes at least one structure unique plug-in section 13 between the ends thereof. To the extent necessary, the description of U.S. patent application Ser. No. 70,010 (now U.S. Pat. No. 3,636,237) is incorporated herein by reference to facilitate understanding of the plug-in bus duct structure of this invention. The ends (FIG. 1) of the bus duct's housing 11 in the plug-in bus duct 10 of this invention, and the ends (FIG. 1) of the busbars 12 themselves of the plug-in bus duct of this invention, may be formed as described in connection with that bus duct taught in U.S. patent application Ser. No. 70,010 (now U.S. Pat. No. 3,636,237). Further, the plug-in bus duct of this invention may be employed with a busbar coupler system of the type taught in U.S. Pat. No. 3,559,148, issued Jan. 26, 1971, invented by Paul M. Hafer and assigned to the assignee of this application.

Having described in detail the preferred embodiment of my invention, what I desire to claim and protect by Letters Patent is:

1. A plug-in bus duct comprising
    a group of elongated, generally flat busbars each of which extends the length of said duct, said busbars each being made up of a plug-in section located between two sandwich sections,
    an elongated housing having side walls of a height substantially greater than the width of said busbars, said side walls being comprised of individual lengths of sandwich sections and plug-in sections, and having a common top wall and common bottom wall that extend the entire bus duct length,
    locator ribs fixed to said sandwich sections' side walls, said plug-in section's side walls being configured such that said walls are captured within a pocket defined by said locating ribs and said top and bottom walls and are held in position by said ribs and said top and bottom walls, thereby cooperating with said sandwich sections' side walls to provide side walls that extend the entire bus duct length,
    said busbars being laterally spaced one from the other and from the sides of the housing in the plug-in section to provide sufficient space to allow engagement of a plug unit's stabs with the busbars, and being positioned in side-by-side relation in the sandwich sections,
    insulator means within said sandwich sections that is of a thickness substantially less than the thickness of said busbars disposed between said busbars and the sides of said housing, said insulator means separating said busbars one from the other and from the sides of said housing,
    structure defining a stab access opening in at least one of the top and bottom walls of said housing, said stab access opening communicating with said plug-in section, and
    an insulator template within said plug-in section that is interposed between said stab access opening and said busbars, said template defining a series of stab holes insulated one from the other such that each hole can receive one stab from the plug unit through said stab access opening in electrical contact with the exposed portion of a busbar.

2. A plug-in bus duct as set forth in claim 1 further comprising
    a cover fixed to said housing, said cover being pivotable between a position at which said stab access opening is open so that said stab holes can receive the plug unit's stabs and a position at which said stab access opening is closed to the environment of said bus duct.

3. A plug-in bus duct as set forth in claim 1 wherein said template is provided with a lip extending therefrom at each of its ends, said lip being adapted to rest on structure immobily fixed to said housing, thereby locating said template in spatial relation with said busbars.

4. A plug-in bus duct as set forth in claim 1 wherein said insulator template has a series of slots on its bottom face that are adapted to seat on said busbar, and a number of holes through it that are equal to the number of said busbars within said housing, said holes being staggered axially of said bus duct so that the holes serving two adjacent busbars are not in the same transverse plane.

5. A plug-in bus duct as set forth in claim 1 including
   a clip spanning said sandwich sections' side walls adjacent each end of said plug-in section along the top of said side walls, the spanning portion of each of said clips being substantially spaced above said busbars,
   a clip spanning said sandwich sections' side walls adjacent each end of said plug-in section along the bottom of said side walls, the spanning portion of each of said clips being substantially spaced below said busbars,
   all of said clips serving to restrain mechanically said busbar group and said sandwich sections' side walls in compact side-by-side relation.

6. A plug-in bus duct as set forth in claim 5 wherein said top and bottom clips are positioned in pairs, each pair comprising a top clip and a bottom clip and being in a plane substantially transverse to the axis of said bus duct, and wherein said clips are substantially U-shaped and fitted over the top edges and bottom edges of said side walls, the legs of said clips being positioned on the outside of said side walls.

7. A plug-in bus duct as set forth in claim 6 wherein said top and bottom walls are comprised of channel sections positioned to face toward one another, the side flanges of said top and bottom walls comprising the locator ribs fixed to said top and bottom walls, and including
   a fin carrying support member restrained in position against said sandwich sections' side walls adjacent said plug-in section by said clips, the fins of said support members comprising the locator ribs fixed to said top and bottom walls.

8. A plug-in bus duct as set forth in claim 7 where the plug-in section's side walls are channel shaped in configuration, the flanges of those side walls including fingers adapted to seat on said fins.

* * * * *